Patented Feb. 16, 1937

2,071,017

UNITED STATES PATENT OFFICE 2,071,017

ARYL PHOSPHORIC ACID HALIDES

Shailer L. Bass, Midland, Mich., assignor to The Dow Chemical Company, Midland, Mich., a corporation of Michigan No Drawing. Application July 13, 1936, Serial No. 90,379

11 Claims. (Cl. 260—99.20)

This invention concerns certain new aryl phosphoric acid halides and a method of making the same.

The new compounds herein disclosed have the general formula

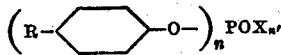

wherein R represents a tertiary alkyl radical, X represents a halogen and $n$ and $n'$ are integers having the sum of 3. Such compounds are substantially non-flammable, possess pronounced fungicidal properties, and may be used to impregnate wood and the like as protection against fungus, molds, etc. They are slowly hydrolyzed by water to form the corresponding aryl phosphoric acids, which also possess fungicidal properties. The new compounds also serve as chemical agents for the preparation of a variety of neutral aryl- and aryl-alkyl-phosphates which are useful as plasticizers in nitrocellulose, cellulose acetate, and cellulose ether compositions. Certain compounds having the above formula are disclosed but not claimed in my co-pending application, Serial No. 2,585, filed January 19, 1935, of which the present application is a continuation in part.

The aryl phosphoric acid halides having the above general formula are prepared by heating a para-tertiaryalkylphenol or alkali metal salt thereof to a reaction temperature with at least 0.5, preferably between 0.75 and 4, molecular equivalents of a phosphorus oxyhalide, e. g. phosphorus oxychloride or oxybromide. A para-tertiaryalkylphenol, rather than its alkali metal salt, is preferred as the phenolic reactant since the free phenol is usually more readily available for such purpose; it reacts as smoothly as does the salt, and hydrogen halide evolved when using the free phenol may be collected as a valuable by-product. The reactions involved are illustrated by the following equations for the formation of para-tertiarybutylphenyl phosphoric acid dichloride and di-(para-tertiarybutylphenyl) phosphoric acid monochloride, respectively:—

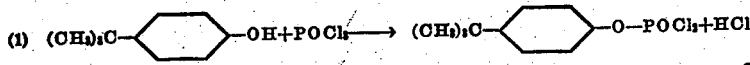

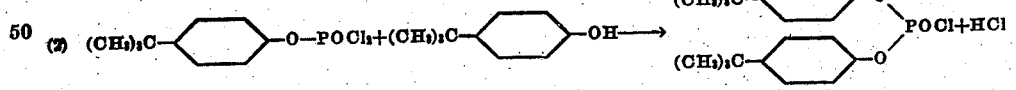

In carrying out the reaction there is a tendency for the aryl phosphoric acid halide initially formed to react further with the phenolic reactant, producing thereby a triaryl phosphate instead of the desired aryl phosphoric acid halide. This tendency becomes more pronounced as the ratio of phosphorus oxyhalide to the phenolic reactant is reduced or the reaction temperature is raised. Accordingly, in preparing a monoaryl phosphoric acid dihalide I prefer to employ 1.5 or more moles of phosphorus oxyhalide per mole of the phenolic reactant and in preparing a diaryl phosphoric acid monohalide I preferably use between 0.75 and 1.5 moles of phosphorus oxyhalide per mole of the phenolic reactant. In either case, the reaction is carried out at the lowest temperature which will permit smooth and reasonably rapid reaction. When using phosphorus oxychloride in the reaction, such temperature is usually between 70° and 95° C. although higher temperatures, e. g. 130° C., may be used. Phosphorus oxybromide may be reacted at somewhat lower temperatures e. g. 60–80° C.

In preparing a para-tertiaryalkylphenyl phosphoric acid mono- or di-halide, a mixture of a para-tertiaryalkylphenol and phosphorus oxychloride, or oxybromide, in the proportions stated above, is heated with stirring under reflux at temperatures within the range just stated until hydrogen halide is no longer evolved from the mixture. The products are then separated by distilling the mixture under vacuum. Ordinarily, both an aryl phosphoric acid dihalide and the corresponding monohalide are obtained from a given reaction, but by regulating the proportions of the reactants and the reaction temperature, as hereinbefore explained, the reaction may be controlled so as to produce the desired product in major proportion.

The following examples illustrate several ways in which the principle of the invention has been applied, but are not to be construed as limiting the invention.

*Example 1*

A mixture of 1501 grams (10 mols) of para-tertiary-butylphenol, 2301 grams (15 mols) of phosphorus oxychloride, and 15 grams of anhydrous magnesium chloride was heated at temperatures varying from 75° to 120° C. for 2.5 hours, i. e. until the evolution of hydrogen chloride from the mixture had substantially ceased. The hot mixture was blown with air to remove hydrogen chloride and then fractionally distilled under vacuum. There was collected 1706 grams of a liquid fraction which distilled over at 176° C. under 10 millimeters pressure. This material boiled at 150–153° C. under 6 millimeters pressure and had the specific gravity 1.244 at 20° C. It was substantially pure para-tertiarybutylphenyl phosphoric acid dichloride having the formula

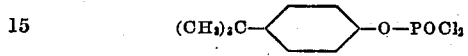

During said distillation there was also separated 191 grams of another fraction of material, distilling between 190° and 310° C. under 10 millimeters pressure, which solidified on cooling. This material was recrystallized from petroleum ether, whereby 27.5 grams of substantially pure di-(para-tertiarybutylphenyl) phosphoric acid monochloride was separated as colorless crystals melting at 100.5–101.5° C. Said product has the formula

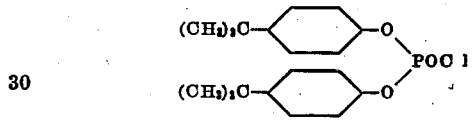

*Example 2*

A mixture of 328.2 grams (2 mols) of para-tertiaryamylphenol and 1027.2 grams (6.7 mols) of phosphorus oxychloride was heated under reflux with stirring at temperatures varying from 83° to 100° C. for approximately 56 hours. The latter was then distilled under vacuum, whereby 407.8 grams (1.45 mols) of substantially pure para-tertiaryamylphenyl phosphoric acid dichloride was obtained, the yield being approximately 73 per cent of theoretical based on the para-tertiaryamylphenol employed. Said product is a colorless liquid which fumes on exposure to moist air, boils at approximately 174° C. under 10 millimeters pressure, and has the specific gravity 1.159 at 25° C. It has the formula

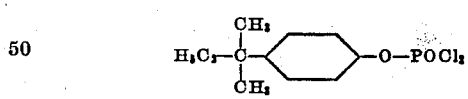

During the distillation there was also obtained 54 grams of a viscous yellow liquid distilling at temperatures above the boiling point of para-tertiaryamylphenyl phosphoric dichloride. This high boiling liquid material included the compound di-(para-tertiaryamylphenyl) phosphoric acid monochloride, having the formula

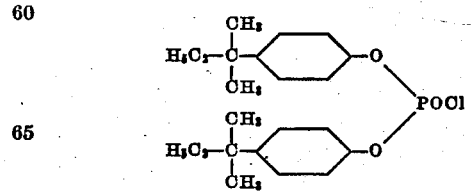

*Example 3*

A mixture of 412 grams (2 mols) of para-tertiaryoctylphenol of freezing point 81° C. (also known as para-diisobutylphenol) and 1224 grams (8 mols) of phosphorus oxychloride was heated under reflux with stirring at temperatures varying from 70° to 100° C. for about 20 hours. The mixture was then fractionally distilled, whereby 414 grams (1.28 mols) of substantially pure para-tertiaryoctylphenyl phosphoric acid dichloride, distilling at temperatures between 197° and 203° C. at 13 millimeters pressure, and 90.8 grams of a higher boiling material, which started distilling at 203° C. under 13 millimeters pressure and was completely distilled at 220° C. under 10 millimeters pressure, were obtained. The para-tertiaryoctylphenyl phosphoric acid dichloride is a clear colorless liquid, boiling at approximately 192–195° C. under 10 millimeters pressure and having the specific gravity 1.159 at 25° C. It has the formula

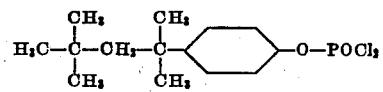

The higher boiling material collected from the distillation was a viscous yellow liquid which fumed on exposure to moist air. It contained the compound, di-(para-tertiaryoctylphenyl) phosphoric acid monochloride having the formula

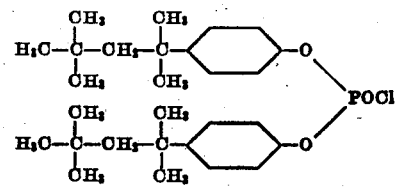

Other para-tertiaryalkylphenyl phosphoric acid halides may be prepared by similar procedure. For instance, para-tertiarybutylphenol may be reacted with phosphorus oxybromide to form the compounds, para-tertiarybutylphenyl phosphoric acid dibromide and di-(para-tertiarybutylphenyl) phosphoric acid monobromide; a para-tertiaryhexylphenol may be reacted with phosphorus oxybromide to form the corresponding mono-(para-tertiaryhexylphenyl)- and di-(para-tertiaryhexylphenyl)-phosphoric acid bromides; etc.

Other modes of applying the principle of the invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:—

1. An aryl phosphoric acid halide having the formula

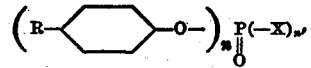

wherein R represents a tertiary alkyl radical, X is a halogen selected from the class consisting of chlorine and bromine, and $n$ and $n'$ are integers having the sum of 3.

2. An aryl phosphoric acid dihalide having the formula

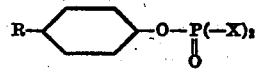

wherein R represents a tertiary alkyl radical and X a halogen selected from the class consisting of chlorine and bromine.

3. A diaryl phosphoric acid monohalide having the formula

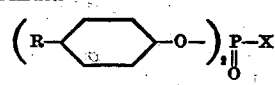

wherein R represents a tertiary alkyl radical and

X a halogen selected from the class consisting of chlorine and bromine.

4. An aryl phosphoric acid chloride having the formula

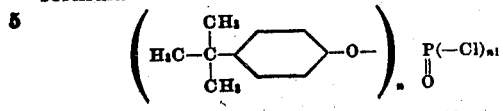

wherein $n$ and $n'$ are integers having the sum of 3.

5. An aryl phosphoric acid chloride having the formula

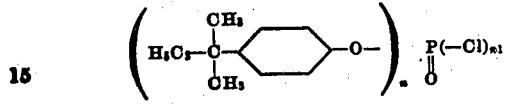

wherein $n$ and $n'$ are integers having the sum of 3.

6. Para-tertiarybutylphenyl phosphoric acid dichloride, a colorless liquid boiling at approximately 150–153° C. at 6 millimeters pressure and having the specific gravity 1.244 at 20° C.

7. Di-(para-tertiarybutylphenyl) phosphoric acid mono-chloride, a crystalline compound melting at approximately 100.5–101.5° C.

8. Para - tertiaryamylphenyl phosphoric acid dichloride, a liquid compound boiling at approximately 174° C. at 10 millimeters pressure and having the specific gravity 1.159 at 25° C.

9. The method of making a para-tertiaryalkylphenyl phosphoric acid halide which comprises reacting a phosphorus oxyhalide selected from the class consisting of phosphorus oxychloride and phosphorus oxybromide with not more than twice its molecular equivalent of a compound selected from the class consisting of a para-tertiaryalkylphenols and their alkali metal salts.

10. The method of making a para-tertiarybutylphenyl phosphoric acid chloride which comprises reacting phosphorus oxychloride with not more than twice its molecular equivalent of para-tertiarybutylphenol.

11. The method of making a para-tertiaryamylphenyl phosphoric acid chloride which comprises reacting phosphorus oxychloride with not more than twice its molecular equivalent of para-tertiaryamylphenol.

SHAILER L. BASS.